United States Patent
Iwano et al.

(10) Patent No.: US 10,919,120 B2
(45) Date of Patent: Feb. 16, 2021

(54) COUPLING MEMBER HEAD

(71) Applicant: TOYOTA JIDOSHA KABUSHIKI KAISHA, Toyota (JP)

(72) Inventors: Yoshihiro Iwano, Toyota (JP); Kosuke Sakurai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 115 days.

(21) Appl. No.: 16/169,467

(22) Filed: Oct. 24, 2018

(65) Prior Publication Data

US 2019/0160608 A1 May 30, 2019

(30) Foreign Application Priority Data

Nov. 28, 2017 (JP) ................. 2017-228173

(51) Int. Cl.
| | |
|---|---|
| *B23P 19/06* | (2006.01) |
| *B21J 5/06* | (2006.01) |
| *B21J 15/30* | (2006.01) |
| *B21J 15/08* | (2006.01) |
| *B23P 19/00* | (2006.01) |

(52) U.S. Cl.
CPC ............. *B23P 19/062* (2013.01); *B21J 5/066* (2013.01); *B21J 15/08* (2013.01); *B21J 15/30* (2013.01); *B23P 19/006* (2013.01); *B23P 19/06* (2013.01)

(58) Field of Classification Search
CPC ....... B23P 19/06; B23P 19/006; B23P 19/062; B21J 5/066; B21J 15/08; B21J 15/30; B21J 15/025; B21J 15/10
See application file for complete search history.

(56) References Cited

U.S. PATENT DOCUMENTS 2,405,033 A * 7/1946 Grimes .................... B21J 15/08
219/150 R

FOREIGN PATENT DOCUMENTS

| | | |
|---|---|---|
| CN | 104955603 A | 9/2015 |
| CN | 105813823 A | 7/2016 |
| EP | 1 118 777 A2 | 7/2001 |
| JP | 7-236979 A | 9/1995 |
| JP | 2001-254716 | 9/2001 |
| JP | 2007-50449 A | 3/2007 |
| JP | 2016-055291 | 4/2016 |

* cited by examiner

*Primary Examiner* — Christopher J Besler
*Assistant Examiner* — Christine Bersabal
(74) *Attorney, Agent, or Firm* — Oblon, McClelland, Maier & Neustadt, L.L.P.

(57) ABSTRACT

A coupling member head includes a holder configured to hold a coupling member at an end portion on a coupling target member side in an axial direction and configured to approach or separate from a coupling target member, a pair of electrodes, tips of the electrodes being positioned closer to the coupling target member side than a coupling member holding region of the holder, and a retraction mechanism configured to move the electrode to a radial outside of the holder when the holder approaches the coupling target member.

6 Claims, 5 Drawing Sheets

COUPLING MEMBER HEAD

INCORPORATION BY REFERENCE

The disclosure of Japanese Patent Application No. 2017-228173 filed on Nov. 28, 2017 including the specification, drawings and abstract is incorporated herein by reference in its entirety.

BACKGROUND

1. Technical Field

The disclosure relates to a coupling member head.

2. Description of Related Art

In a case where a tapping screw is coupled to a thin metal plate or the like, the screw is rotated at a high speed on the front surface of the metal plate to heat and soften the metal plate such that the tapping screw penetrates and tapping is performed.

On the other hand, in a case where the metal plate is a high strength material, a tip of the screw may be melted before the metal plate is softened, and coupling may not be possible.

Meanwhile, a technique of providing heating means by a laser on a screw head, and preheating the metal plate by the heating means to couple a screw to the thin metal plate is disclosed (see Japanese Unexamined Patent Application Publication No. 2001-254716 (JP 2001-254716 A)).

SUMMARY

In a case of the related art, since the heating is performed by the laser, it is needed to correct a focal point or a position of the laser for each incident point (coupling position.)

The disclosure provides a coupling member head which enables a coupling of a high strength material as well and facilitates heat treatment.

An aspect of the disclosure relates to a coupling member head. The coupling member head includes a holder configured to hold a coupling member at an end portion on a coupling target member side in an axial direction and configured to approach or separate from a coupling target member, a pair of electrodes, tips of the electrodes being positioned closer to the coupling target member side than a coupling member holding region of the holder, and a retraction mechanism configured to move the electrode to a radial outside of the holder when the holder approaches the coupling target member.

In the coupling member head formed as described above, first, the holder is positioned at a coupling position of the coupling target member. In this case, first, the tips of the electrodes positioned closer to the coupling target member side than the coupling member holding region of the holder abut against the coupling target member. By energizing the electrodes in the above state, the coupling position of the coupling target member is heated and softened. By having the holder approach the coupling target member, the coupling member held at the end portion on the coupling target member side of the holder in the axial direction penetrates the coupling position of the coupling target member to be coupled to the coupling target member.

When the holder approaches the coupling position of the coupling target member, since the tip of the electrode moves to the radial outside of the holder from the coupling position of the coupling target member by the retraction mechanism, it is hard that the electrode and the coupling member interfere with each other.

In the coupling member head according to the aspect of the disclosure, the retraction mechanism may include a link member configured to be movable relative to the holder when the holder approaches or separates from the coupling target member, and disposed on a side separate from the coupling target member further than the end portion of the holder in the axial direction. The link member may be configured to rotatably support the electrodes in a direction orthogonal to the axial direction of the holder as a rotation axis. The electrode may include an abutting portion configured to abut against the holder when the holder approaches the coupling target member.

In the coupling member head formed as described above, when the holder approaches the coupling target member, the holder approaches relatively the tip of the electrode supported by the link member. In this case, the holder abuts against the abutting portion provided on the electrode, and the electrode rotatably supported by the link member rotates around the rotation axis extending in the direction orthogonal to the axial direction of the holder. Accordingly, the electrode moves from the coupling target member side of the holder to the radial outside of the holder and separates from the coupling target member. Therefore, when the coupling member is coupled to the coupling target member, it is hard that the electrode interferes with the coupling member or the holder.

According to the aspect of the disclosure, a high strength material can also be coupled and heat treatment is facilitated.

According to the aspect of the disclosure, the device configuration can be further simplified.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
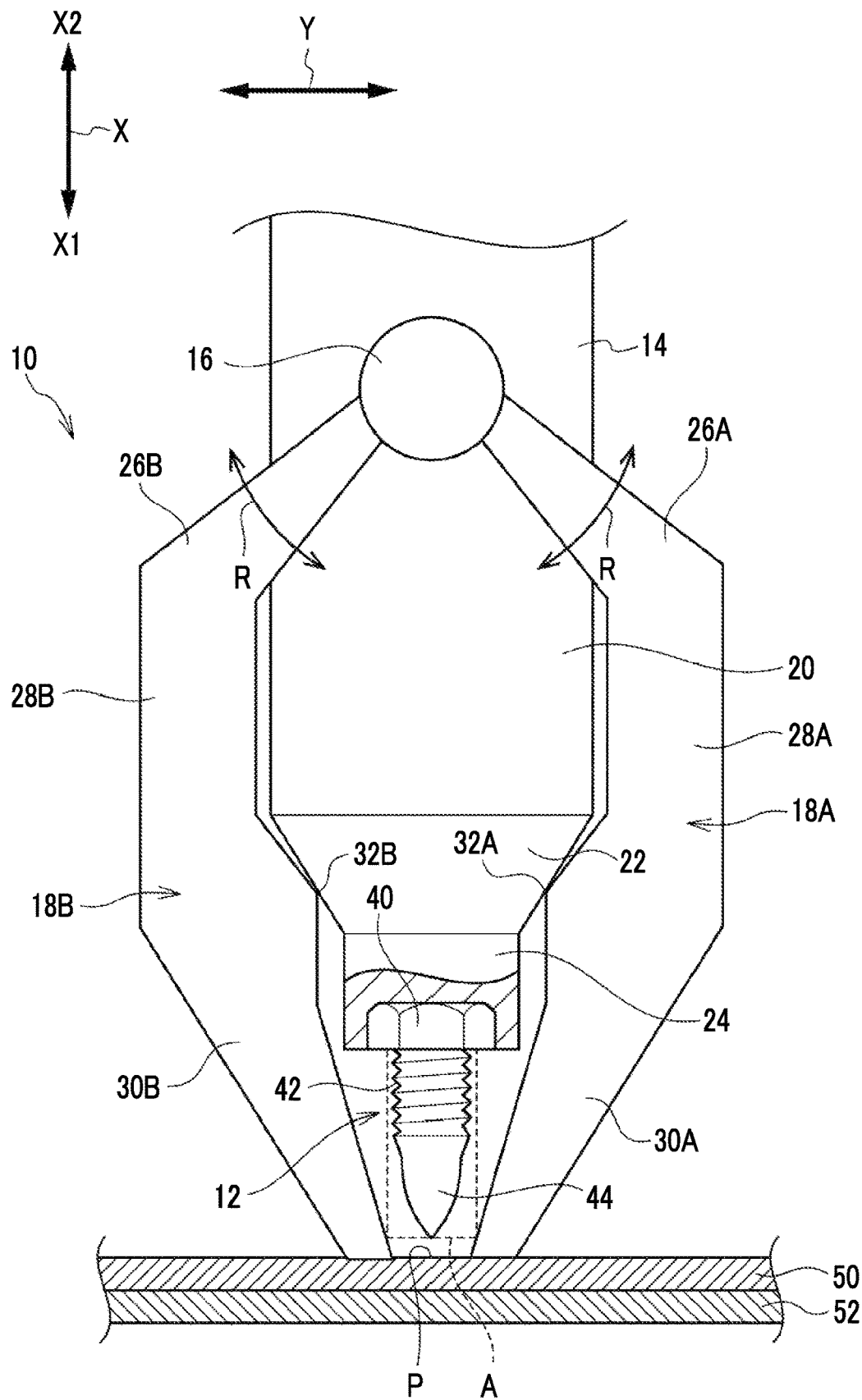
FIG. 1 is a side view showing an overall configuration (electrode abutting state) of a screw head according to an embodiment.

A screw head, which is one type of a coupling member head according to an embodiment of the disclosure, will be described with reference to FIGS. 1 to 5. In each drawing, an arrow X indicates an axial direction of a holder, an arrow Y indicates a radial direction of the holder, and an arrow R indicates a rotational direction of an electrode. In the axial direction of the holder, a first metal plate 50 side may be referred to as "lower" and the opposite side may be referred to as "upper".

Configuration

First, the configuration of the screw head will be described.

A screw head 10 includes a holder 14 that holds a tapping screw 12 (hereinafter referred to as "screw 12") which is a coupling member, a link member 16 supported by a holding member (not shown) different from the holder 14, and a pair of electrodes 18A, 18B rotatably supported by the link member 16.

The holder 14 includes a cylindrical body portion 20, a tapered portion 22 having a tapered surface that is formed to decrease in diameter from the body portion 20 at one end (lower end) side of the body portion 20 in the axial direction (arrow X1 direction), and a cylindrical holding portion 24 extending toward one end side of the tapered portion 22 in the axial direction.

The holding portion 24 has a chuck (not shown) that holds a head portion 40 of the screw 12 at one end portion in the axial direction.

The link member 16 is a cylindrical shaft body supported by a holding member different from the holder 14 and is disposed to have an axial direction in the radial direction of the holder 14 (body portion 20). The link member 16 rotatably supports the electrodes 18A, 18B respectively around the axis. The link member 16 is formed of an insulator.

As shown in FIG. 1, the electrode 18A has an enlarged portion 26A which has an upper end (end portion on the arrow X2 direction side) supported by the link member 16 and extends from the link member 16 to an outside of the body portion 20 of the holder 14 in a side view, a parallel portion 28A extending in a direction parallel to the axial direction of the holder 14 from a lower end (end portion on the arrow X1 direction side) of the enlarged portion 26A in a side view, and a reduced portion 30A extending below the screw 12 (screw holding region A) held by the holding portion 24 of the holder 14 from a lower end (end portion on the arrow X1 direction side) of the parallel portion 28A.

In other words, the lower end (end portion on the arrow X1 direction side) of the electrode 18A is positioned below the screw holding region A of the holder 14.

Here, the "screw holding region A" is a cylindrical region surrounding a portion of the screw 12 exposed to the outside from the holder 14, and refers to a range extending radially outward by 1 mm from an end portion of the screw 12 in the radial direction. It is more preferable that the lower end of the electrode 18A is positioned below an exposed portion of the screw 12 (threaded portion 42 and base material penetrating portion 44 described later).

In the enlarged portion 26A, the width (thickness) increases from an upper end portion held by the link member 16 toward a lower end portion. The width (thickness) of the parallel portion 28A is substantially constant in the axial direction.

Meanwhile, the reduced portion 30A is formed such that the width (thickness) of the reduced portion 30A gradually decreases from an upper end portion toward a lower end portion. An abutting portion 32A, however, is formed to protrude toward the holder 14 side on a surface of the reduced portion 30A on the holder 14 side, the surface being in an upper portion of the reduced portion 30A (parallel portion 28A side).

The electrode 18A formed as described above is rotatable around (axis of) the link member 16 in the arrow R direction, as shown in FIG. 1, by the link member 16 rotatably supporting an upper end of the enlarged portion 26A.

At an initial position of the screw head 10, the abutting portion 32A of the electrode 18A abuts against the holder 14 (tapered portion 22) such that the electrode 18A separates from the screw 12 held at a tip of the holder 14 or other parts of the holder 14.

The link member 16, the abutting portion 32A of the electrode 18A, and the tapered portion 22 of the holder 14 are examples of a retraction mechanism.

Since the electrode 18B is formed symmetrically with the electrode 18A, the same constituent elements are denoted by adding B instead of A to the same reference numerals, and a detailed description thereof will be omitted.

A tip of the reduced portion 30A of the electrode 18A and a tip of a reduced portion 30B of the electrode 18B are separate from each other.

The link member 16 held by the holding member and the holder 14 are attached together at a tip of a jig and are configured to be integrally movable. However, as will be described later, in a case where the holder 14 approaches or separates from the first metal plate 50 to perform coupling of the screw 12, the link member 16 does not move. That is, the link member 16 is configured to be movable relative to the holder 14.

The screw 12 has the head portion 40 of a hexagonal column shape, a threaded portion 42 extending from the head portion 40 in the axial direction and having a thread formed on an outer circumferential surface, and a base material penetrating portion 44 that decreases in diameter from a lower end portion of the threaded portion 42 in the axial direction toward a tip.

The first metal plate 50 and a second metal plate 52 that are stacked are coupled together by the screw 12. The first metal plate 50 and the second metal plate 52 are examples of a coupling target member.

Operation

Next, the operation of the screw head will be described. Specifically, a case where the first metal plate 50 and the second metal plate 52 that are stacked are coupled together by the screw 12 will be described.

First, the holder 14 is moved (positioned) above a coupling position P where the first metal plate 50 and the second metal plate 52 are coupled together by the screw 12. In this case, tips of the electrodes 18A, 18B which are integrally moved with the holder 14 and are supported by the link member 16 are positioned below the screw holding region A of the holding portion 24 of the holder 14, that is, below a lower end of the screw 12, and abut against the first metal plate 50.

Lower ends of the electrodes 18A, 18B abut against the first metal plate 50 at positions facing each other across the coupling position P of the first metal plate 50. Therefore, by energizing the electrodes 18A, 18B for a certain period of time, the vicinity of the coupling position P of the first metal plate 50 and the second metal plate 52 that are stacked is heated and softened.

After the certain period of time has elapsed, the holder 14 is moved (pressurized) downward (first metal plate 50 side (arrow X1 direction side)) while the holder 14 is rotated around the axis. In this case, the holder 14 descends downward in the axial direction; however, the electrodes 18A, 18B supported by the link member 16 do not move downward in the axial direction. That is, the electrodes 18A, 18B and the holder 14 move relative to each other in the axial direction.

Figure 2:
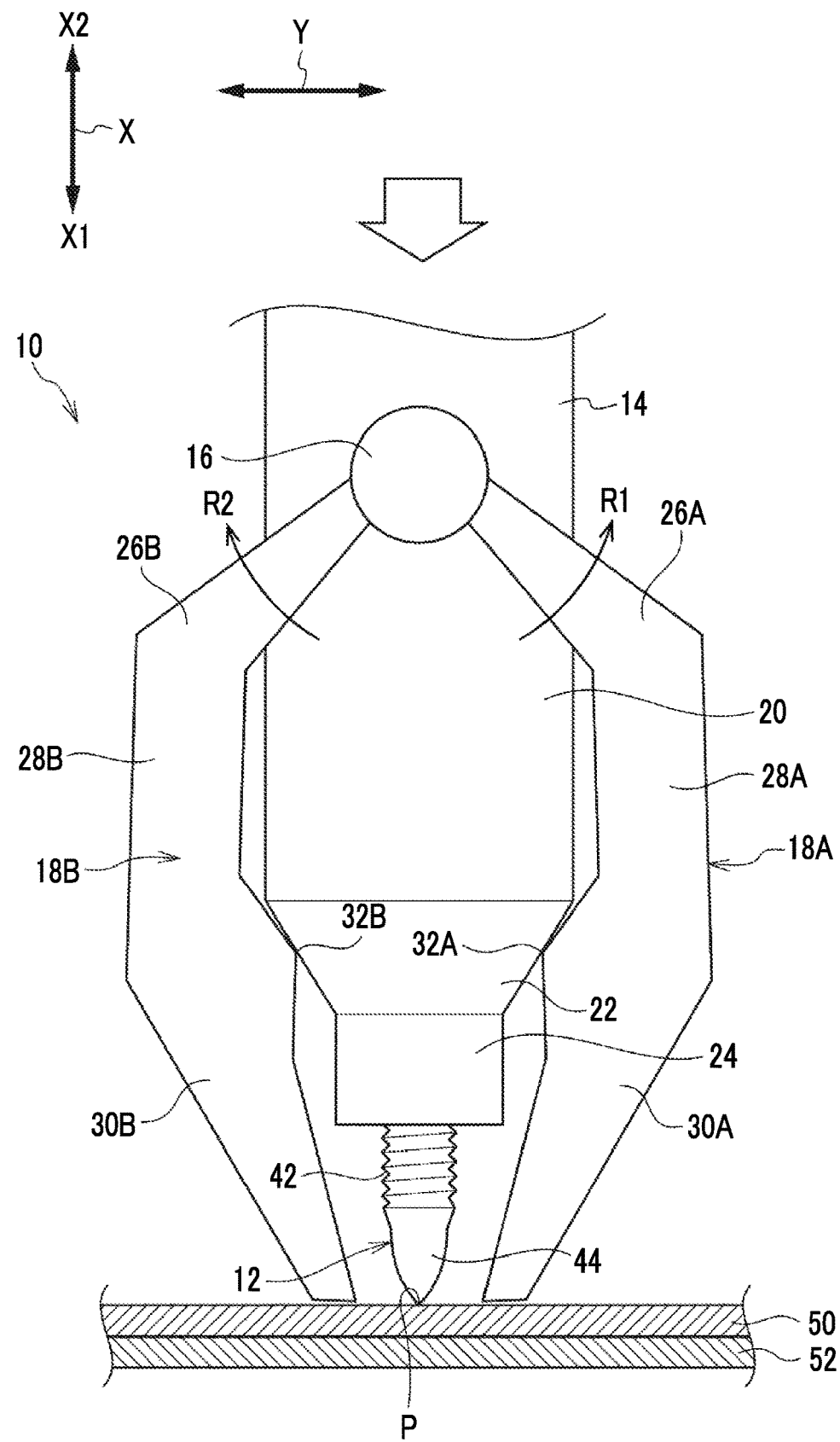
FIG. 2 is a side view showing a screw abutting state of the screw head according to the embodiment.

As a result, as shown in FIG. 2, as the holder 14 descends, abutting portions 32A, 32B of the electrodes 18A, 18B move relatively upward on the tapered portion 22 of the holder 14.

Figure 3:
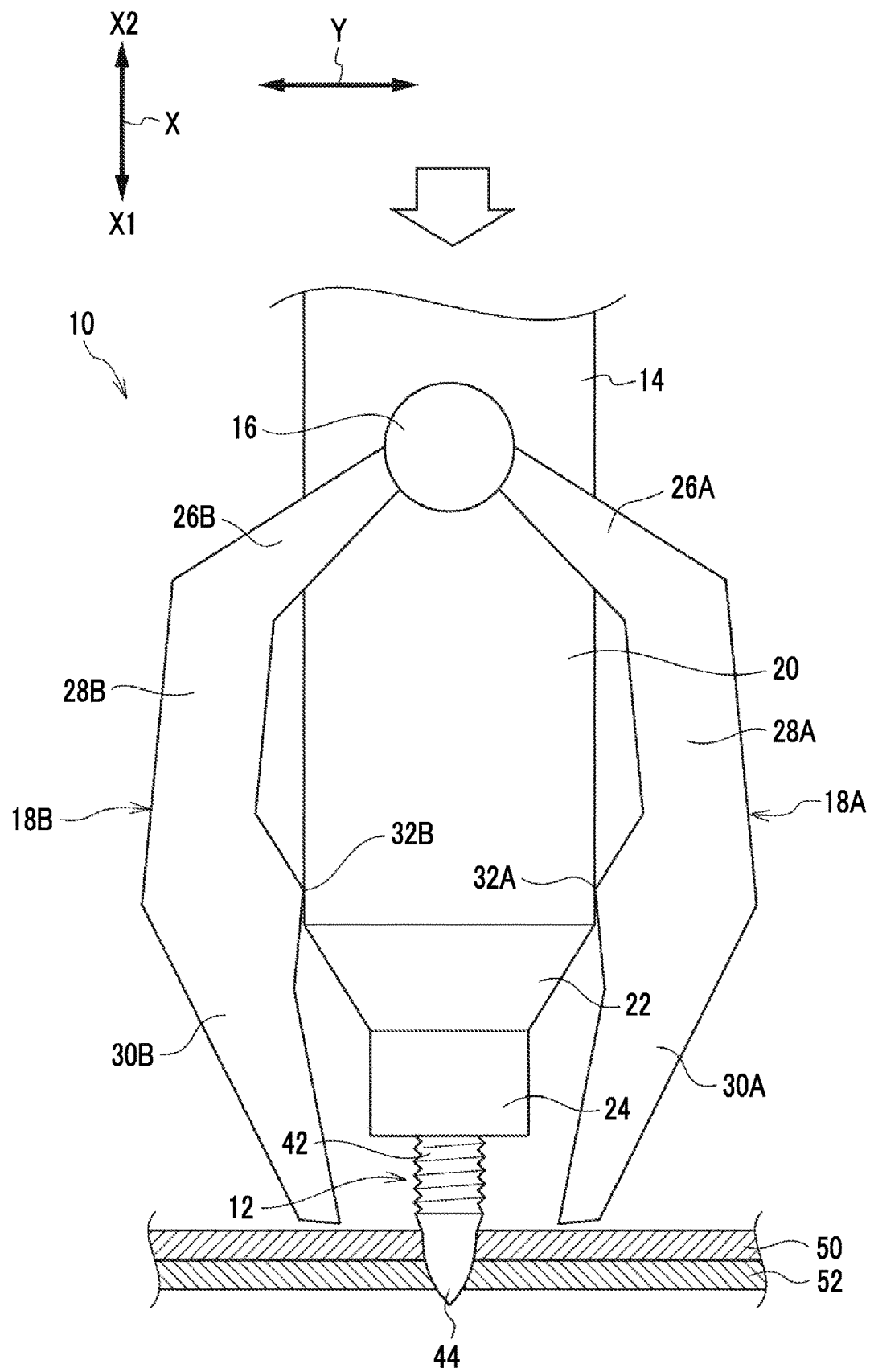
FIG. 3 is a side view showing a screw penetration state of the screw head according to the embodiment.

As a result, around the axis of the link member 16 as the rotation center, the electrode 18A rotates in the arrow R1 direction (counterclockwise direction in FIG. 3) and the electrode 18B rotates in the arrow R2 direction (clockwise direction in FIG. 3). That is, the electrodes 18A, 18B move to a radial outside of the holder 14 from below the screw 12 (screw holding region A) and separate from the first metal plate 50.

In the above described state, by pressurizing the holder 14 further downward and rotating the holder 14 around the axis, the coupling position P of the first metal plate 50 and the second metal plate 52 softened by energizing and heating is penetrated by the base material penetrating portion 44 of the screw 12, as shown in FIG. 3.

In this case, since the abutting portions 32A, 32B of the electrodes 18A, 18B move on an outer circumferential surface of the body portion 20 that increases in diameter from the tapered portion 22 of the holder 14, the tips of the electrodes 18A, 18B move further to the radial outside of the holder 14. As a result, interference between the holding portion 24 of the descending holder 14 and the electrodes 18A, 18B is suppressed.

Figure 4:
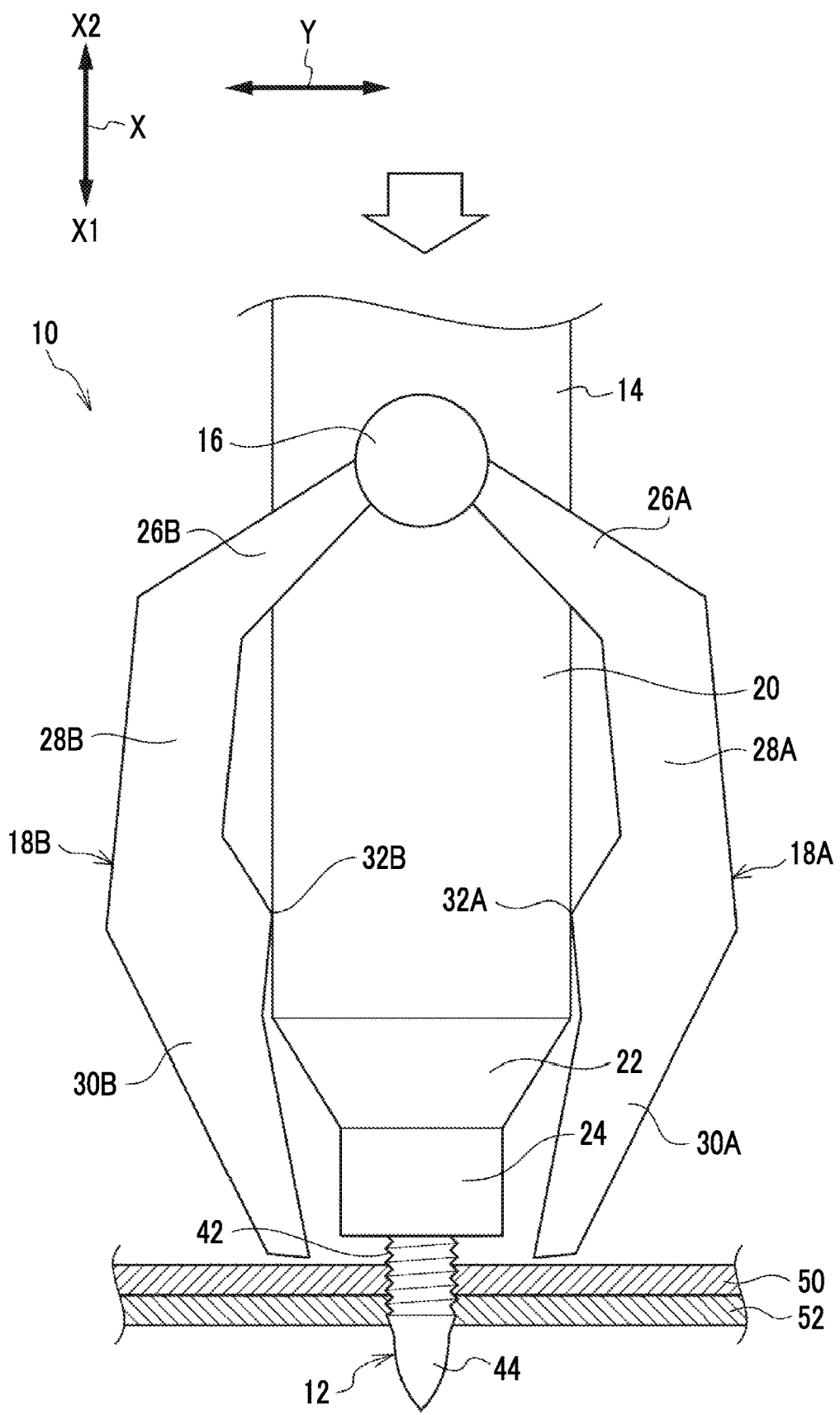
FIG. 4 is a side view showing a tapping state of the screw head according to the embodiment.

Further, by rotating the holder 14 while moving the holder 14 downward, as shown in FIG. 4, penetrated portions of the first metal plate 50 and the second metal plate 52 are tapped by the threaded portion 42 of the screw 12.

Figure 5:
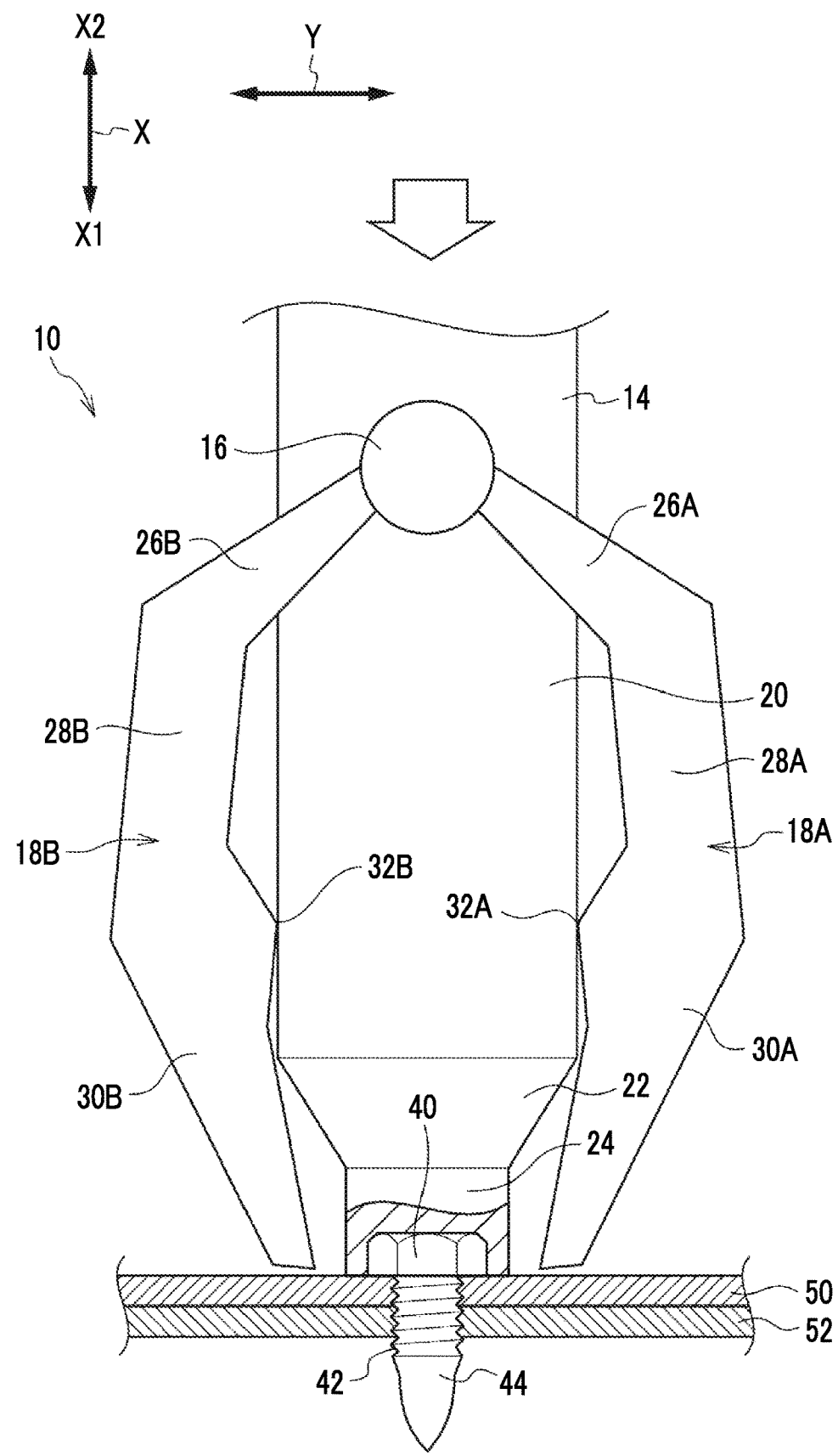
FIG. 5 is a side view showing a fastened state of the screw head according to the embodiment.

Further, as shown in FIG. 5, by rotating the holder 14 while pressurizing the holder 14 downward, the head portion 40 of the screw 12 abuts against the first metal plate 50, and the screw 12 is coupled to the first metal plate 50 and the second metal plate 52 with a predetermined torque. That is, the first metal plate 50 and the second metal plate 52 can be fastened by the screw 12.

As described above, in the screw head 10 according to the embodiment, the tips of the electrodes 18A, 18B are disposed to be positioned below the screw holding region A of the holding portion 24 of the holder 14, therefore, before the holder 14 (screw 12) abuts against the first metal plate 50, the electrodes 18A, 18B abut against the first metal plate 50 to perform energization, and thus a portion including the coupling position P of the first metal plate 50 and the second metal plate 52 that are stacked can be energized and heated.

That is, since the coupling position P of the first metal plate 50 is softened by energizing and heating before the screw 12 reaches the first metal plate 50, penetration of the screw 12 or the like is facilitated. Accordingly, even in a case where the first metal plate 50 and the second metal plate 52 are high strength steel plates, the screw 12 can be coupled thereto.

Since the electrodes 18A, 18B have the configuration in which merely the abutting portions 32A, 32B abut against the holder 14 and the electrodes 18A, 18B do not abut against the screw 12, heating and melting of the screw 12 due to the electrodes 18A, 18B is reliably suppressed.

In particular, merely by positioning the holder 14 above the coupling position P of the first metal plate 50 and the second metal plate 52, which are the coupling target members, the lower ends of the electrodes 18A, 18B that are supported by the link member 16 and that are positioned below the screw holding region A of the holder 14 can abut against the first metal plate 50 across the coupling position P from each other. Therefore, by energizing the electrodes 18A, 18B, the portion including the coupling position P of the first metal plate 50 and the second metal plate 52 that are stacked can be energized and heated. That is, merely by positioning the holder 14 with respect to the coupling position P of the first metal plate 50, the lower ends of the electrodes 18A, 18B are positioned in the vicinity of the coupling position P of the first metal plate 50, and by energizing the electrodes 18A, 18B, the vicinity of the coupling position P of the first metal plate 50 and the second metal plate 52 that are stacked can be softened, and thus heat treatment (positioning of the electrodes 18A, 18B, or the like) is facilitated.

Further, the link member 16 rotatably supports the electrodes 18A, 18B respectively around the rotation axis extending in a direction orthogonal to the axial direction of the holder 14. The electrodes 18A, 18B have the abutting portions 32A, 32B which abut against the tapered portion 22 of the holder 14 on a tip side and are protrudingly formed, the abutting portions 32A, 32B of the electrodes 18A, 18B move on outer circumferential surfaces of the tapered portion 22 and the body portion 20 of the holder 14 merely by the relative movement of the holder 14 and the electrodes 18A, 18B in the axial direction of the holder 14, and the electrodes 18A, 18B move to the radial outside from below the screw 12. As the holder 14 descends further, the electrodes 18A, 18B move to the radial outside of the holding portion 24 of the holder 14. That is, as the holder 14 descends, the interference between the electrodes 18A, 18B and the screw 12 or the holder 14 is suppressed.

As described above, since the electrodes 18A, 18B can move to the radial outside from below the screw holding region A of the holder 14 by being pressed to the outer circumferential surface of the holder 14 (tapered portion 22 and body portion 20), it is not needed to provide a new drive mechanism to move the electrodes 18A, 18B to the radial outside of the holder 14, and the device configuration is simplified.

Since the tips of the electrodes 18A, 18B supported by the link member 16 are positioned below the screw holding region A below the holding portion 24 of the holder 14, when the tips of the electrodes 18A, 18B abut against a front surface of the first metal plate 50, the electrodes 18A, 18B do not abut against the screw 12, and it is possible to suppress the heating of the screw 12 due to energization.

As long as the tips of the electrodes 18A, 18B abut against the first metal plate 50 at positions facing each other across the coupling position P of the first metal plate 50 and the second metal plate 52, the positional accuracy is not strictly needed, and thus the heat treatment is facilitated.

Others

In the embodiment, although the screw 12 has been described as a coupling member, the aspect of the disclosure is also applicable to other coupling members such as a nail or a rivet. In the case of the nail or the rivet, since tapping is not needed, the holder 14 is configured not to rotate.

In the embodiment, although the example in which the screw head 10 is used for coupling the first metal plate 50 and the second metal plate 52 has been described, the aspect of the disclosure may be applied to a case where a screw is coupled to a piece of metal plate. The aspect of the disclosure may be applied to a case where a screw is coupled to three or more pieces of metal plates.

Further, the mechanism in which the electrodes 18A, 18B move to the radial outside of the holder 14 at the time when the holder 14 descends is not limited to the embodiment. Other mechanisms may be used, and the electrodes 18A, 18B may be configured to move by a driving force of another driving source.

What is claimed is:

1. A coupling member head comprising:
    a holder configured to hold a coupling member at an end portion on a coupling target member side in an axial direction and configured to approach or separate from a coupling target member;
    a pair of electrodes, tips of the electrodes being positioned closer to the coupling target member side than a coupling member holding region of the holder; and
    a retraction mechanism configured to move the tips of the electrodes to a radial outside of the holder when the holder approaches the coupling target member.

2. The coupling member head according to claim 1, wherein
    the retraction mechanism includes a link configured to be movable relative to the holder when the holder approaches or separates from the coupling target member, and disposed on a side separate from the coupling target member farther than the end portion of the holder in the axial direction;
    the link is configured to rotatably support the electrodes in a direction orthogonal to the axial direction of the holder as a rotation axis; and
    the electrode each include an abutting portion configured to abut against the holder when the holder approaches the coupling target member.

3. The coupling member head according to claim 1, wherein
    the retraction mechanism includes a link that rotatably supports the pair of electrodes around an axis of the link, the axis of the link being in a radial direction of the holder.

4. The coupling member head according to claim 1, wherein
    the holder includes
        a cylindrical body, and
        a tapered surface that decreases in a radial direction of the holder and that extends from the cylindrical body in an axial direction of the holder.

5. The coupling member head according to claim 4, wherein
    the pair of electrodes each include an abutting portion configured to abut against the tapered surface when the holder approaches the coupling target member to move the tips of the electrodes to the radial outside of the holder.

6. The coupling member head according to claim 4, wherein
    the holder includes a holding portion that holds the coupling member and the extends from the tapered surface in the axial direction of the holder.

* * * * *